United States Patent [19]
Gentry, Jr.

[11] Patent Number: 5,663,952
[45] Date of Patent: Sep. 2, 1997

[54] CHECKSUM GENERATION CIRCUIT AND METHOD

[75] Inventor: Denton E. Gentry, Jr., Palo Alto, Calif.

[73] Assignee: Sun Microsystems, Inc., Mountain View, Calif.

[21] Appl. No.: 499,484

[22] Filed: Jul. 7, 1995

[51] Int. Cl.⁶ .................................................. G06F 11/10
[52] U.S. Cl. ...................... 370/252; 370/395; 370/419; 370/463; 371/53; 371/54
[58] Field of Search ................ 370/60.1, 60, 94.1, 370/13, 17, 241, 252, 395, 410, 426, 419, 463, 522; 371/53, 54, 37.1, 37.7, 36, 22.5, 22.3, 20.1, 20.4, 20.5, 48, 49.1, 49.2; 380/49, 50

[56] References Cited

U.S. PATENT DOCUMENTS

| | | | |
|---|---|---|---|
| 5,111,465 | 5/1992 | Edem et al. | 371/54 |
| 5,247,524 | 9/1993 | Callon | 371/54 |
| 5,390,196 | 2/1995 | Cecil et al. | 371/37.1 |
| 5,500,864 | 3/1996 | Gomia et al. | 371/53 |

*Primary Examiner*—Wellington Chin
*Assistant Examiner*—Huy D. Vu
*Attorney, Agent, or Firm*—Blakely Sokoloff Taylor & Zafman

[57] ABSTRACT

A circuit and method for generating a checksum for a TCP packet on the fly. A stream of 32-bit data words from a TCP packet is split into two 16-bit data word streams and separately summed using 16-bit adders. The carry-out from the adders is tied to the carry-in thereof so as to incorporate any carry bits generated into the sum. At the end of the data stream, three further summing cycles are used in order to generate the final 16-bit one's complement checksum. First, the two 16-bit data stream partial sums are added together, including any carry bit from one of the adders while the carry-out from the other adder is stored. In the second cycle the stored carry-out and the carry-out from the first cycle are added into the sum. In the third cycle, any carry bit generated in the second cycle is added to the sum so as to produce the final checksum.

23 Claims, 3 Drawing Sheets

5,663,952

CHECKSUM GENERATION CIRCUIT AND METHOD

BACKGROUND OF THE INVENTION

This invention relates to a circuit and a method for determining a checksum for a digital data packet. The circuit and method of the invention find particular application in determining a checksum for a digital data packet under the Transmission Control Protocol (TCP).

In digital telecommunications, data is frequently conveyed in streams of data symbols or signals called 'packets'. To allow verification of received data, the packets may include a code which can be derived from the transmitted data. One such type of code is a checksum, which is utilized in Transmission Control Protocol (TCP) packets. The checksum is calculated from the data to be transmitted in the packet, and added to the header of the packet along with other information such as source and destination indications, before transmission of the packet takes place. When the packet is received at the destination, the checksum is retrieved from the packet header, and a new checksum is calculated from the received packet data. The received checksum and the newly calculated checksum are then compared, with any discrepancy indicating that the received packet does not precisely match the packet as it was transmitted.

One way in which a checksum can be generated for a packet to be transmitted is to utilize the host processor, from which the data packet originates, to calculate the checksum before the data is passed to the telecommunications interface for transmission. In this case the checksum is generated using a software algorithm to control a general purpose processor. Although this system requires no additional hardware to implement the checksum provision and the data packets can be assembled before leaving the host processor, generating the checksums can place an undesirable burden on the host processor and is not an optimum allocation of the host processing resources.

Since the checksum value for a data packet can only be determined when all of the data to be transmitted in the packet has been assembled, the checksum generation can be performed in the telecommunications interface which couples the host processor to the telecommunications network. A multipurpose processing circuit under software control could be employed for this purpose. However, it is generally desirable to provide as many of the telecommunications interface functions as possible on a single integrated circuit, in which case a dedicated checksum generation circuit may be more efficient in terms of silicon area required. Also, with the checksum being determined at the telecommunications interface, it is necessary to generate the checksum for packets 'on the fly', which also recommends a fast and compact dedicated summing circuit.

In order to calculate a 16 bit TCP checksum it is necessary to take the 16 bit one's complement sum of the TCP packet data. In essence this requires that all of the 16 bit data be summed, with the carry-out from the 16 bit result being added into the sum. One way in which such a sum can be achieved is to sequentially sum all of the 16 bit data using an adder which produces a greater than 16 bit result, and then adding the most significant bits exceeding the desired 16 bit sum (i.e. the collective carry for the 16 bit additions) back into the 16 bit checksum for two addition cycles. However, the adder circuit required to generate the checksum In this way can be prohibitively complex, particularly when a relatively large packet is to be dealt with.

The complexity of generating a 16 bit TCP checksum is further compounded when the packet input data path is 32 bits wide, given that the checksum is to be generated on the fly. In that case, unless the checksum generator is able to operate at twice the speed as the incoming data, a 32 bit per processing cycle data input capability is required. Thus, according to the checksum generation strategy outlined above, either a single very complex adder circuit with 32 bit input paths and a greater than 32 bit output would be required, or a pair of 16 bit input adders with collective carry-outputs (i.e. greater than 16 bit sum output), as well as additional circuitry and summing cycles, would be required in order to produce a 16 bit checksum result.

Accordingly, it is one object of the invention to provide for the generation of a TCP checksum in a circuit with a minimum number and complexity of circuit elements, as well as a minimum of processing cycles.

It is another object of the invention to provide a checksum generation circuit which can be implemented in a telecommunications interface integrated circuit for generating checksum values for data packets on the fly.

It is also an object of the invention to provide a method of sequentially processing a data stream so as to generate a checksum in a minimum number of processing cycles.

SUMMARY OF THE INVENTION

In accordance with the present invention there is provided a checksum generator for generating an N bit checksum from data provided on first and second N bit data inputs. The checksum generator comprises first and second adders, each for summing two N bit operands. An output of the first adder is coupled to feedback an N bit sum result to a first input of the first adder, and a carry-out of the first adder is coupled to feedback a carry bit to a carry-in of the first adder. A second input of the first adder is coupled to receive data from the first N bit data input. An output of the second adder is coupled to feedback an N bit sum result to a first input of the second adder, and a carry-out of the second adder is coupled to feedback a carry bit to a carry-in of the second adder. A second input of the second adder is coupled to receive data from said second N bit data input, but is multiplexed with the output of the first adder as well as the carry-out of the first adder.

By providing the feedback of the adder outputs and carry-outs back to inputs of the respective adders, the adders are able to sum the incoming N bit data as well as folding any carry bits generated into the accumulated sums. Then, when the incoming data has all been summed, the outputs of the two adders can be added together with any leftover carry bits, in order to create the final checksum, by virtue of the input to the second adder being multiplexed from the input data, the sum output of the other adder and the carry-out of the other adder. Any carry bits generated when combining the partial sums and carries from the two adders are folded into the final checksum by the carry-out feedback connection.

In one form of the invention, registers are provided in the feedback connections from the adder sum outputs in order to temporarily store the sum outputs. Multiplexed inputs can also be provided to these registers to enable the registers to be initialized to zero to begin generation of a checksum, or the registers can be loaded with a partial checksum value stored previously if the checksum generation is interrupted, for example, in the middle of a packet of data.

The invention also provides a method for generating a checksum from a pair of first and second data streams. The method involves synchronously summing the first and second data streams in a series of summing cycles, at each summing cycle utilizing a carry-out value from a preceding summing cycle as a carry-in value. This results in first and second sums having first and second carry values. The first and second sums are added, together with the first carry value, so as to generate a third sum having a third carry value. The second and third carry values are added to the third sum, creating a fourth sum and fourth carry value. Finally, the fourth carry value is added to the fourth sum so as to generate a checksum for the data contained in the first and second data streams.

In the preferred embodiment of the invention, the checksum to be generated is a 16 bit one's complement sum of data to be transmitted in a TCP packet. The packet data is received on a 32 bit data path, which is separated into the least significant 16 bits of data and the most significant 16 data bits for the first and second data streams, respectively. For each summing cycle of the input packet data, the carry-out bit signal is fed back to the carry-in for the next cycle. Then, after all of the input data has been added, a further three processing cycles only are required in order to add the two 16 bit sums and incorporate all of the carry bits to form the final 16 bit checksum.

The sum result and carry-out feedback structure and interconnection of the adders provided in the checksum generator of the present invention enable a TCP checksum circuit to be implemented with minimal circuit complexity, which is particularly advantageous where the checksum circuit is to be included as a portion of an integrated circuit. Also, it is apparent from the foregoing summary that the inventive checksum generator and method allow a TCP checksum to be produced with only three additional cycles in excess of the number of cycles required to input all of the packet data. The minimized processing time is particularly useful where the checksum is to be generated on the fly, as may be required of a checksum generator provided in a communications interface circuit.

The invention is described in greater detail herein below, by way of example only, with reference to the accompanying drawings illustrating a preferred embodiment of the invention.

DETAILED DESCRIPTION OF THE PREFERRED EMBODIMENT

The present invention relates to a method and circuit for generating a checksum for a data packet. Some portions of the description which follow are presented in terms of symbolic representations of operations on data bits originating from a computer. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, terms, data, or the like. It should be borne in mind, however, that all of these and similar terms are to be associated with the appropriate physical quantities and are merely convenient labels for those quantities.

Further, the manipulations performed are often referred to in terms, such as adding, which are commonly associated with mental operations performed by a human operator. No such capability of a human operator is necessary or desirable in most cases in any of the operations described herein which form part of the present invention; the operations are machine operations. In all cases the distinction between the method operations in operating a computational apparatus and the method of computation itself should be borne in mind.

Figure 1:
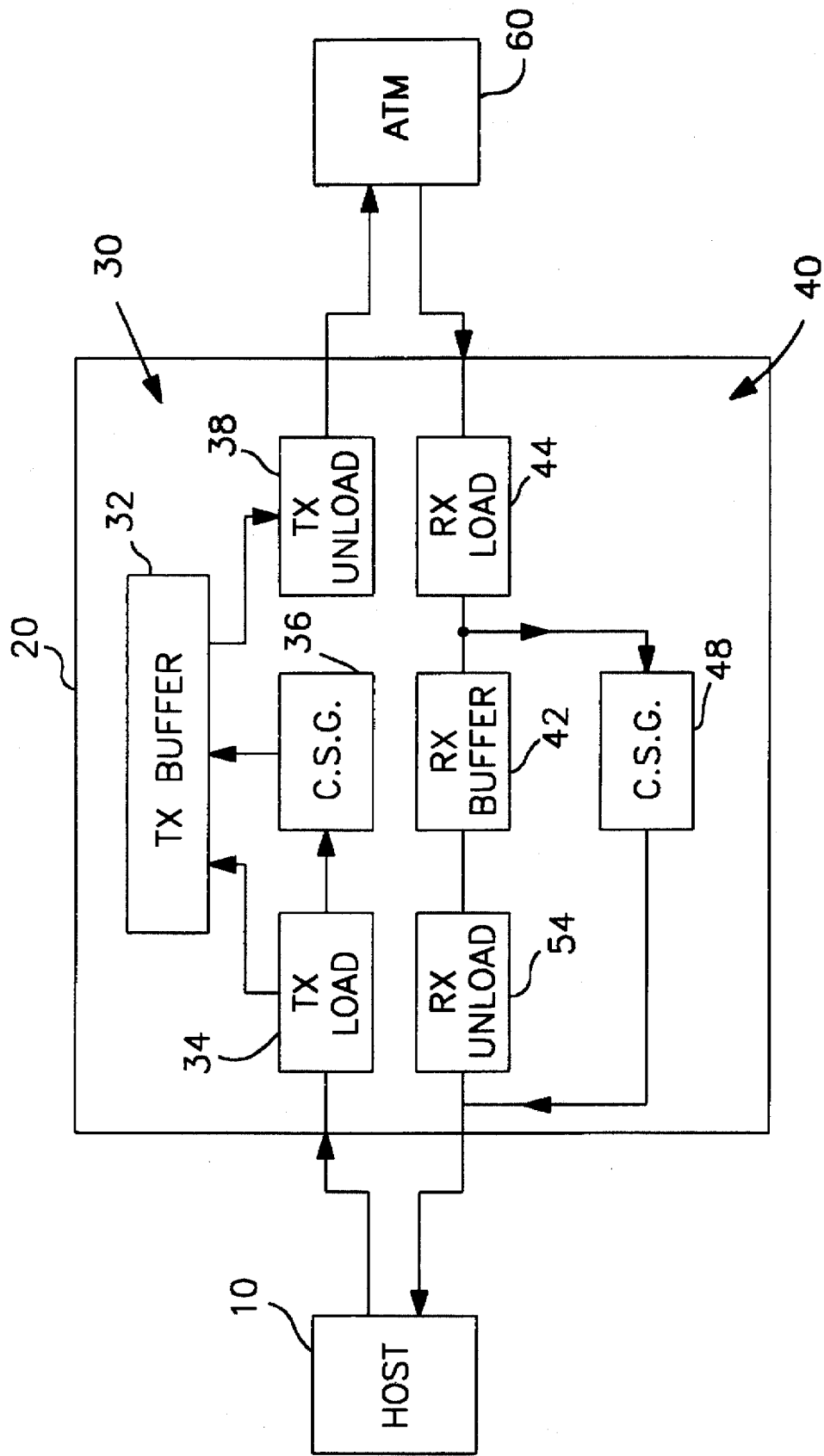
FIG. 1 is a simplified block diagram of a computer interface to a telecommunications network, illustrating an application of a checksum generator according to the preferred embodiment of the invention.

In FIG. 1 there is shown a simplified functional block diagram of a host computer 10 coupled to an asynchronous transfer mode (ATM) node 60 of a telecommunications network, by way of a network interface circuit 20. The interface circuit 20 comprises a transmit portion 30 which receives data from the host computer 10 for transmission to the ATM network node 60, and a receiving portion 40 which receives data from the ATM node 60 and passes the received data to the host computer 10. Data, which is passed to and from the host computer 10 may typically be in the form of transmission control protocol (TCP) packets of several kilobytes, whereas data passing through the ATM node 60 is in the form of ATM cells of 53 bytes. Thus, one of the functions of the interface 20 is to segment a TCP packet from the host computer 10 into cells to be passed to the ATM node 60, and to reassemble cells received from the ATM node 60 into TCP packets for the host computer 10. Each TCP packet is provided with a header portion which includes a 16 bit checksum which is the one's compliment of the one's compliment sum of all 16 bit words in the header and text of the packet in which it is included. The preferred embodiment of the present invention is concerned with the generation of the checksum from the packet data (including the header information).

The transmission portion 30 of the interface 20 shown in FIG. 1 comprises a transmission buffer 32 which is of a size capable of storing an entire TCP packet passed from the host computer 10. A transmission load engine 34 is provided to load a packet of data from the host computer 10 into the transmission buffer 32, and a transmission unload engine 38 is provided to retrieve the packet data from the transmission buffer 32, and segment the packet data into ATM cells which are passed to the ATM node 60. A checksum generator 36 also receives the packet data from the transmission load engine 34, and generates a checksum value for the packet data while it loaded into the transmission buffer 32. The generated checksum value is then stored in the appropriate location in the transmission buffer 32, in the header of the packet stored therein.

The purpose of the checksum is to enable a determination, at the receiving end, of whether transmission of a packet of data has been achieved without error. Thus, the receiving portion 40 of the interface 20 also includes a checksum generator 48. In the receiving portion 40, a receive load engine 44 receives cell data from the ATM node 60, and reassembles a TCP packet in a receive buffer 42. The packet data from the receive load engine 44 is also passed to the checksum generator 48, which generates a checksum value for the received data while the data is being stored in the buffer 42. When all of the packet data is received, a receive unload engine 54 passes the packet to the host computer 10, together with the generated checksum value from the checksum generator 48. The host computer may be required to subtract any packing data included in the packet for transmission purposes from the generated checksum. The host computer then extracts the checksum value included in the header of the received packet, and compares it with the generated checksum. If the received checksum value does not match the checksum value generated from the received data, this is indicative that the received packet data does not match the packet data as it was transmitted, and that an error has occurred during transmission. In that case, a message may be passed from the host computer back to the source of the packet to re-transmit the packet which was erroneously received.

Figure 2:
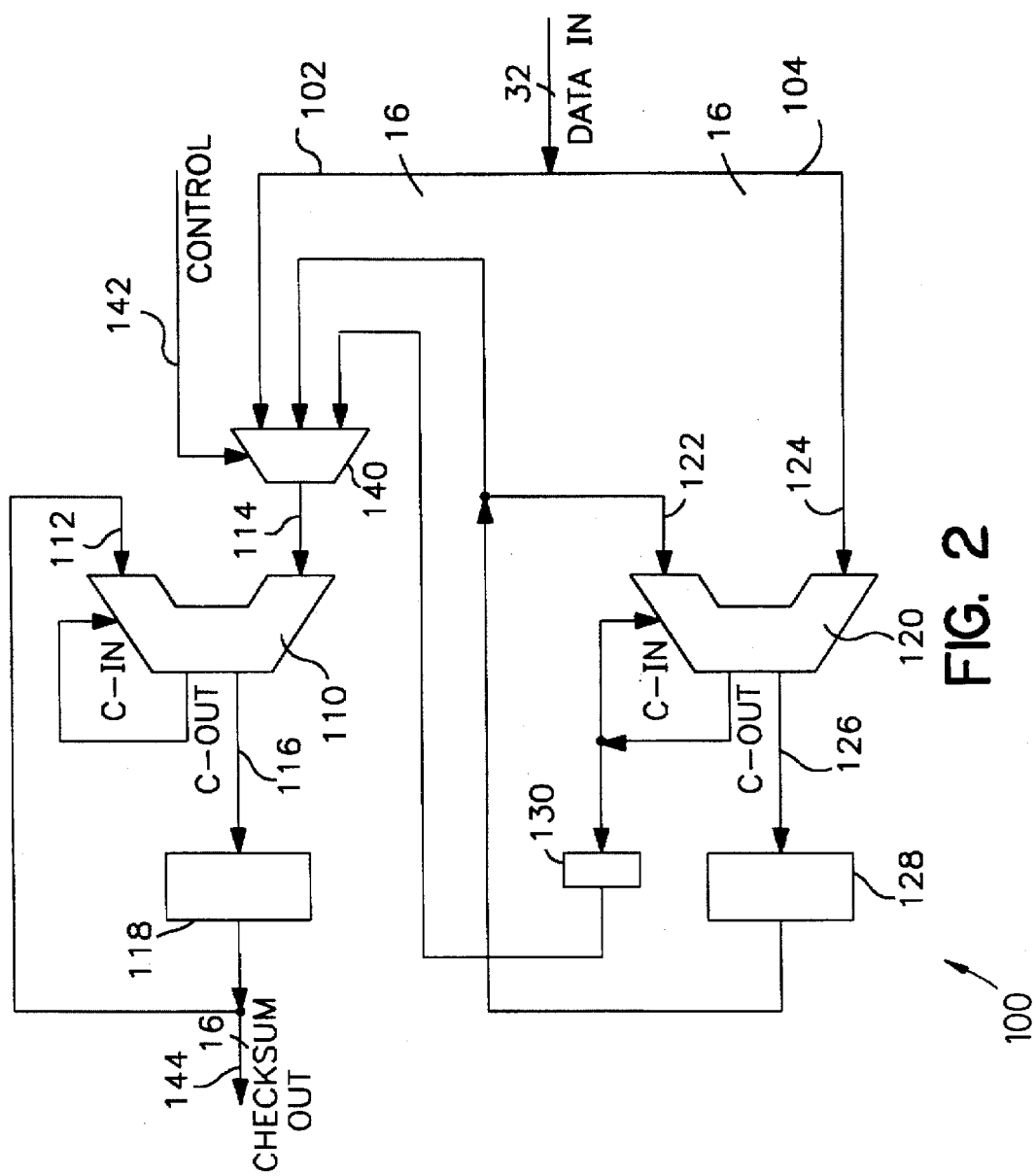
FIG. 2 is a simplified circuit block diagram illustrating the basic structure of the preferred embodiment checksum generator circuit.

FIG. 2 shows the basic circuit structure of a checksum generator according to the preferred embodiment of the invention. The checksum generator 100 receives 32 bit words of data at the data input, and produces a 16 bit checksum value at checksum output 144. The 32 bit input data is divided into two 16 bit half words, which are carried on inputs 102, 104. The basic structure of the checksum generator 100 comprises a pair of 16 bit adding circuits 110, 120 which sum the 16 bit data half words from the input lines 102, 104 respectively. The adder 110 has 16 bit inputs 112 and 114, a 16 bit output 116, and a single bit carry-out. The input 114 is coupled to receive the most significant half word from input line 102, by way of a multiplexing circuit 140. The output 116 of the adder 110 is coupled to a register 118, which is also coupled back to the input 112 of the adder 110. Also, the carry-out of the adder 110 is coupled to feedback to the carry-in thus, for each cycle of the adder circuit 110, the data input to adder input 114 is summed with the previous cycle output of the adder 110, which is passed to input 112 by way of the register 118, together with any carry from the previous cycle which is passed to the carry-in of the adder.

Adding circuit 120 is structured similarly to that of adder 110, with input 124 being coupled to receive the least significant half word from input line 104. The output 126 of adder 120 is coupled to a register 128, which feeds back into 16 bit input 122. Similarly, the carry-out of adder 120 is coupled to feed back to the carry-in thereof. A register 130 is also provided to temporarily store the carry-out from the adder 120, the register 130 being coupled as an input to the multiplexing circuit 140. Finally, the register 128 provides another input to the multiplexing circuit 140. The multiplexing circuit 140 is also provided with a control input 142, which controls whether the multiplexer 140 passes signals from the most significant half word input 102, the register 128, or the register 130.

The operation of the checksum generator 100 is as follows. Packet data is received by the generator 100 in a series of 32 bit data words, which are split into 16 bit half words and passed to the adders 110, 120. For each word of packet data, the adders 110 and 120 are cycled so as to sum the respective data half words, which is enabled by the feedback arrangement of the adder outputs 116, 126 and carry outputs. When all of the packet data has been summed, the two 16 bit sums produced by the adders 110, 120 must be added together, along with the last remaining carry bit from each adder, and the carry bit that may be generated when adding the two 16 bit sums, in order to generate the final checksum. The checksum generator 100 accomplishes this in an additional three cycles, as follows.

In the first cycle, the control input 142 of the multiplexing circuit 140 is controlled so as to pass the least significant half word sum stored in register 128 through the multiplexer 140 to the input 114 of adder 110. Thus, in the first cycle the least significant half word sum from register 128 is added to the most significant half word sum from register 118. During this cycle, the last remaining carry bit from adder 110 is also incorporated. The last remaining carry bit from adder 120 is temporarily stored in the register 130 during the first additional cycle.

In the second cycle, the multiplexer 140 is controlled so as to pass the contents of register 130 to input 114 of the adder 11 0, and the adder 110 is cycled so as to add the last remaining carry bit from adder 120 into the sum.

Finally, in the third additional cycle, the adder 110 is cycled with zero input at the input 114 so as to add any carry bit generated during the second additional cycle. The completed TCP checksum is then available in the register 118, for an output line 144.

Figure 3:
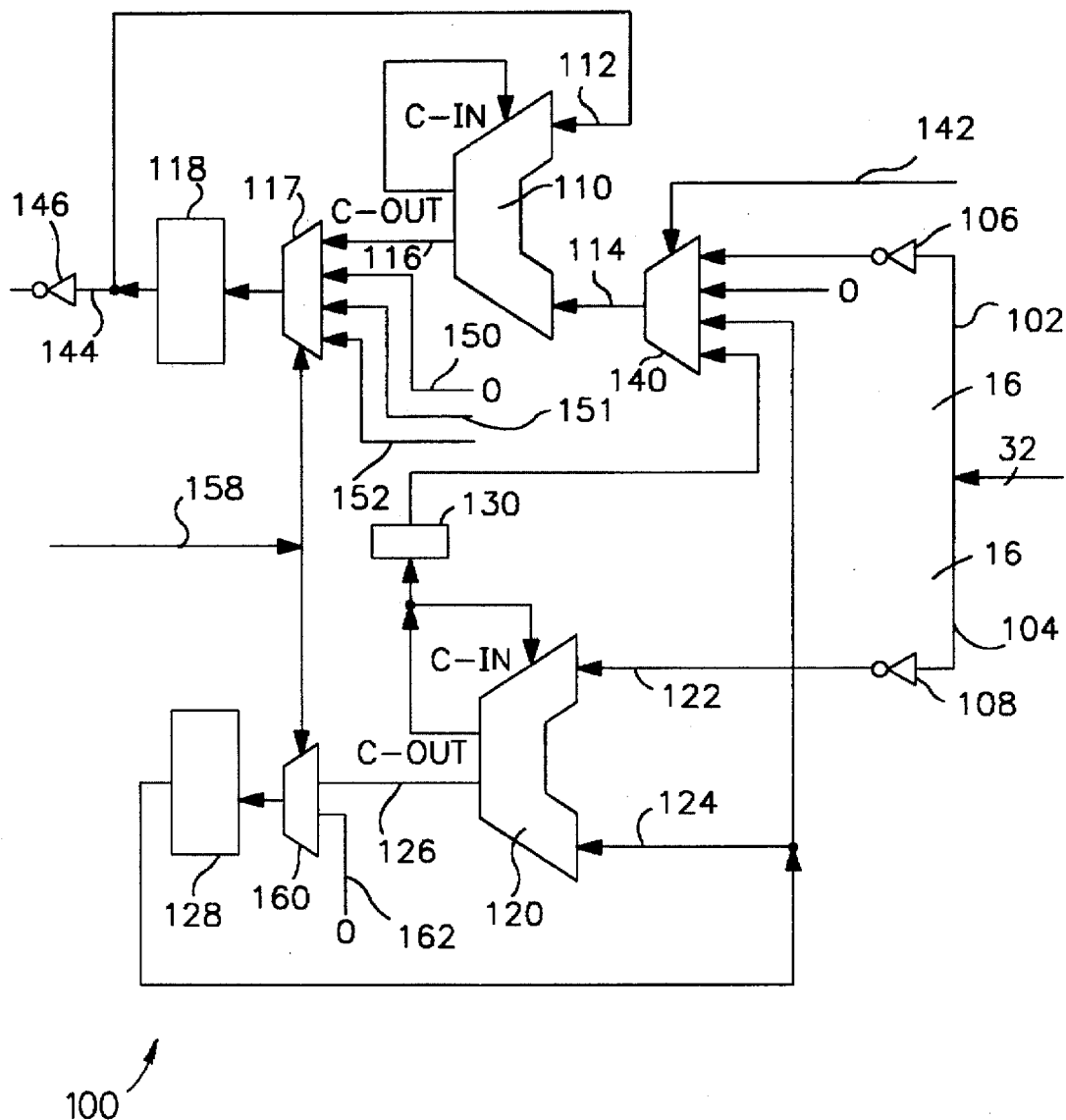
FIG. 3 is a circuit block diagram of the preferred embodiment checksum generator circuit.

The checksum generator 100 shown in FIG. 3 includes some additional components. The input and output signals to the checksum generator 100 are complimented using inverters 106, 108 and 146 provided on the input lines 102, 104 and output lines 144, respectively. A zero input is provided to the multiplexing circuit 140, which is passed to the adder input 114, under control of the control signal 142, during the third additional cycle of the adder 100 as described above. A multiplexing circuit 117 is interposed between the output 116 from the adder 110, and the result register 118. As well as the output 116 from the adder 110, the multiplexing circuit 117 is provided with initializing inputs 150, 151 and 152, and the selection of the output of the multiplexing circuit 117 is controlled from a control line 158. Initializing input 150 provides a zero input to the multiplexing circuit 117 to enable the register 118 to be initialized to zero to begin processing a new packet of data. A multiplexing circuit 160, having a zero initializing input 162 and receiving input from output line 126 of adder 120, is also provided and controlled from control line 158, in order to initialize the result register 128.

Referring again to FIG. 1, in some instances the transmission load engine 34 which provides the input data to the checksum generator will load a packet of data from the host computer 10 in portions. For example, the transmission buffer 32 may be adapted to store a plurality of packets of data, which are loaded by the transmission load engine 34 in a time multiplexed fashion. The same applies for the receiving portion of the interface 20, since consecutive cells arriving from the ATM node 60 may not necessarily rate to the same TCP packet. Thus, the checksum generator 100 is provided with a means for outputting a partial checksum value generated from a portion of a TCP packet, and for loading the partial checksum value back into the checksum generator when the next portion of that TCP packet arrives as input. For this purpose, initialization inputs 151,152 are provided to the multiplexing circuit 117, from which the register 118 can be loaded, under control of the control line 158, with a partial checksum value.

The majority of functions performed by the interface 20 sown in FIG. 1 can be provided by a single application specific integrated circuit (ASIC) on a network interface card (NIC) which couples to the host computer 10. The checksum generator 100, in the preferred embodiment, is thus provided as a portion of the ASIC, which may be fabricated in, for example, CMOS technology. In this case, control circuitry would also be included in the ASIC to pass packet data and partial checksum values as input to the checksum generator (lines 104, 102 and 151, 152), and provide control signals such as on control lines 142 and 158 for controlling the operation of the checksum generator circuit in the manner described above. The actual structure of the checksum generator components, such as the adders 110, 120, registers 118, 128 and multiplexers 117, 140, 160 are well known to those skilled in the art, and description of these structures are therefore not included here.

While the preferred embodiment of the invention is described herein above in the context of an ATM network interface circuit, it is envisaged that the checksum generator and method disclosed herein is capable of broader application. Therefore, while the present invention has been described in conjunction with the above embodiment, it is evident that numerous alternatives, depictions, variations and uses will be apparent to those skilled in the art in light of the foregoing description. Accordingly, the detailed description of the present invention herein above has been presented by way of example only, and it is to be understood that the scope of the present invention and the features essential thereto is defined in the appended claims which are not to be unnecessarily limited by reference to the foregoing description of the preferred embodiments.

What is claimed is:

1. A checksum generator circuit comprising:
    a first adder having first and second adder inputs, a first sum output, and having a first carry-out coupled to feedback a first generated carry bit to a carry-in of the first adder, said first adder input being coupled to receive first input data, and said first sum output being coupled to feedback first partial sum data to said second adder input; and
    a second adder having third and fourth adder inputs, a second sum output, and having a second carry-out coupled to feedback a second generated carry bit to a carry-in of the second adder, said second sum output being coupled to feedback second partial sum data to said third adder input, and wherein said fourth adder input is coupled to said first adder to selectively receive second input data, said first partial sum data from said first sum output, and said first generated carry bit from said first carry-out.

2. A checksum generator as claimed in claim 1, including a first register coupled from said first sum output to said second adder input to temporarily store said first partial sum data, and a second register coupled from said second sum output to said third adder input to temporarily store said second partial sum data.

3. A checksum generator as claimed in claim 2, including a multiplexer having an output coupled to said fourth adder input and having inputs coupled to said first sum output, said first carry-out and to a data source to receive said second input data.

4. A checksum generator as claimed in claim 3, wherein said multiplexer is coupled to said first carry-out by way of a carry register for temporarily storing said first generated carry bit.

5. A checksum generator as claimed in claim 4, including a pre-load circuit coupled to at least one of said first and second registers for initializing said at least one register with previously stored partial sum data.

6. A checksum generator for generating an N bit checksum from data provided on first and second N bit data inputs, comprising:
    a first adder for summing two N bit operands, an output of the first adder being coupled to feedback an N bit sum result to a first input of the first adder, a carry-out of the first adder being coupled to feedback a carry bit to a carry-in of the first adder, and a second input of the first adder being coupled to receive data from said first N bit data input; and
    a second adder for summing two N bit operands, an output of the second adder being coupled to feedback an N bit sum result to a first input of the second adder, a carry-out of the second adder being coupled to feedback a carry bit to a carry-in of the second adder, and a second input of the second adder being coupled to receive data from said second N bit data input;
    wherein the output of the second adder and the carry-out of the second adder are multiplexed with said first N bit data input to the second input of the first adder.

7. A checksum generator as claimed in claim 6, including a first result register coupled to said output of said first adder and said first input of said first adder, and a second result register coupled to said output of said second adder and said first input of said second adder.

8. A checksum generator as claimed in claim 7, including a first multiplexer having inputs coupled to receive said first N bit data input, said output of said second adder, said carry-out of said second adder, and a zero input, and having an output coupled to said second input of said first adder.

9. A checksum generator as claimed in claim 8, including a carry register coupled to said store a carry-out value from said carry-out of said second adder and to pass the stored carry-out value to said multiplexer.

10. A checksum generator as claimed in claim 9, including a second multiplexer having an output coupled to said first result register, and having a first input coupled to said output of said first adder, and at least one second input coupled to receive initialization data.

11. A checksum generator as claimed in claim 10, including a third multiplexer having an output coupled to said second result register, and having a first input coupled to said output of said second adder, and a second input coupled to receive initialization data.

12. A checksum generator as claimed in claim 11, wherein said first and second N bit data inputs each comprise a 16 bit data input.

13. A checksum generator circuit for generating a checksum from a stream of data values, comprising:
    a first binary adder having first and second adder inputs, a first sum output, a first carry-output and a first carry input, said first carry-output being coupled to said first carry input;
    a second binary adder having third and fourth adder inputs, a second sum output, a second carry-output and a second carry input, said second carry-output being coupled to said second carry input;
    a first register coupled to said first sum output and said first adder input;
    a second register coupled to said second sum output and said third adder input; and
    a multiplexer having an output coupled to said second adder input, and having inputs coupled to receive a first data input, and coupled to said second register and said second carry-output;
    said fourth adder input being coupled to receive a second data input.

14. A checksum generator circuit as claimed in claim 13, wherein said first and second data inputs comprises 16 bit data words, and said first and second sum outputs comprise 16 bit outputs.

15. A checksum generator circuit as claimed in claim 13, further comprising an initialization multiplexer having an output coupled to said first register, a first input coupled to said first sum output and at least one second input coupled to receive initialization data for initializing said first register.

16. A checksum generator circuit as claimed in claim 15, further comprising a second initialization multiplexer having an output coupled to said second register, a first input coupled to said second sum output and a second input coupled to receive a binary zero input.

17. A method for generating a checksum from a pair of first and second data streams, comprising the steps of:

synchronously summing the first and second data streams in a series of summing cycles, at each summing cycle utilizing a carry-out value from a preceding summing cycle as a carry-in value, so as to generate first and second sums having first and second carry-out values;

adding said first and second sums with said first carry-out value, so as to generate a third sum having a third carry-out value;

adding said second and third carry-out values to said third sum, so as to generate a fourth sum having a fourth carry-out value; and adding said fourth carry-out value is added to said fourth sum so as to generate a checksum for the data contained in the first and second data streams.

18. A method as claimed in claim 17, wherein said first and second data streams each comprise streams of 16-bit data, and said checksum comprises a 16-bit sum.

19. A method as claimed in claim 17, including a step of summing at least one of said first and second data streams with an initial partial sum.

20. A method as claimed in claim 19, including a step of suspending the summing of said first and second data streams, and storing at least one partial sum.

21. A data transmission interface for coupling a host computer for communication through an asynchronous transfer mode (ATM) telecommunications network, comprising:

a load engine coupled to retrieve a packet of data from said host computer;

a segmentation engine for segmenting said data packet into cells and passing the cells of data to said ATM network; and a checksum generator coupled to receive said data packet from said load engine, and for generating a checksum value from said data packet to be passed to said ATM network by way of said segmentation engine, said checksum generator comprising:

a first adder having first and second adder inputs, a first sum output, and having a first carry-out coupled to feedback a first generated carry bit to a carry-in of the first adder, said first adder input being coupled to receive first input data from said load engine, and said first sum output being coupled to feedback first partial sum data to said second adder input; and a second adder having third and fourth adder inputs, a second sum output, and having a second carry-out coupled to feedback a second generated carry bit to a carry-in of the second adder, said second sum output being coupled to feedback second partial sum data to said third adder input, and wherein said fourth adder input is coupled to said first adder to selectively receive second input data from said load engine, said first partial sum data from said first sum output, and said first generated carry bit from said first carry-out.

22. A data transmission interface as claimed in claim 21, including a transmission buffer memory coupled to said load engine and said segmentation engine for buffering said data packet, said transmission buffer memory also being coupled to receive said checksum value from said second sum output for insertion of said checksum value in a header portion of the data packet buffered in said buffer memory.

23. A data transmission interface as claimed in claim 22, wherein said data packet is retrieved by said load engine in four-byte words, said first input data comprising a first half of each word of the data packet and said second input data comprising a second half of each word of the data packet.

* * * * *